(No Model.)
R. F. HARGRAVES.
FRICTION RATCHET CLUTCH.
No. 495,328. Patented Apr. 11, 1893.
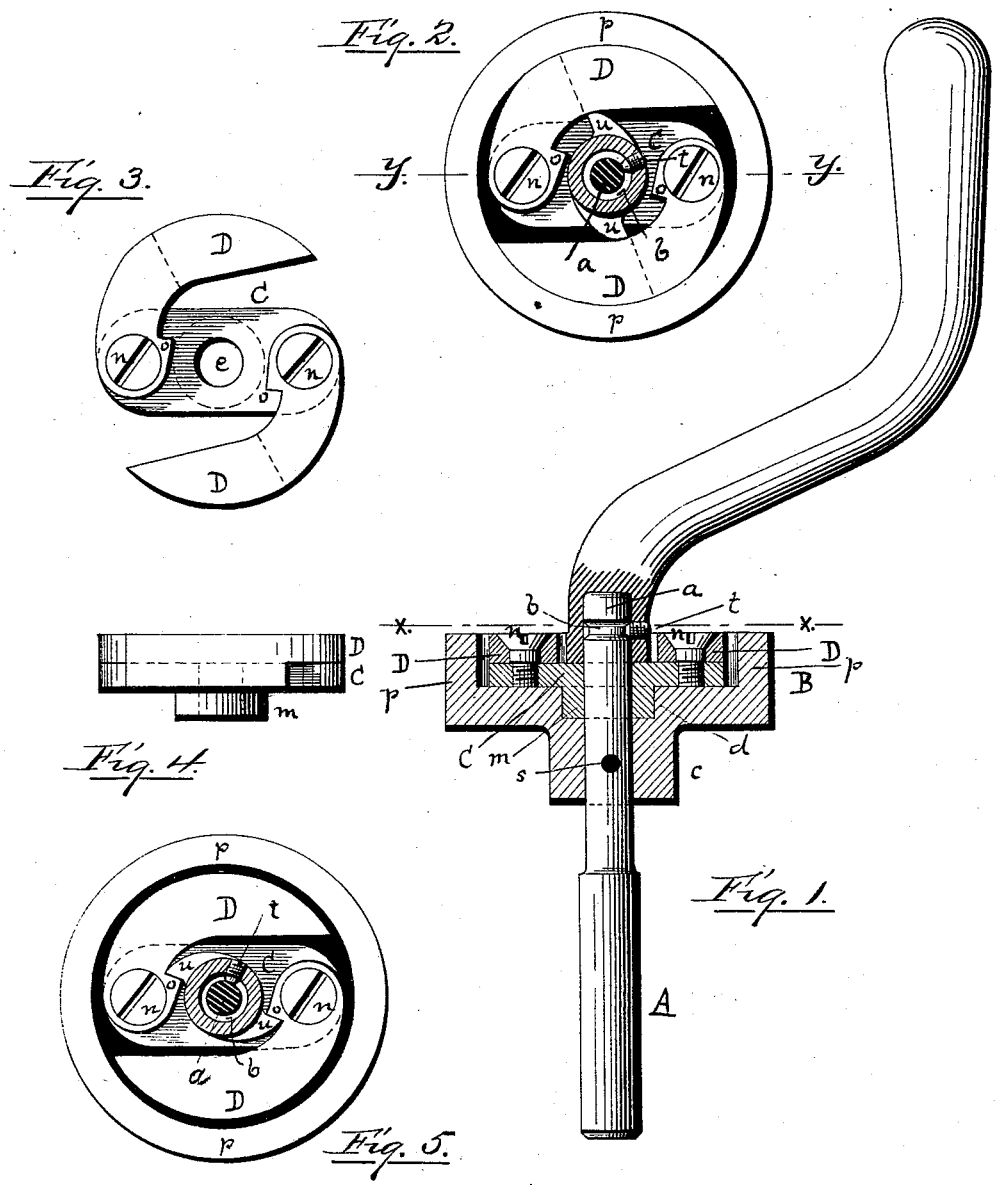

UNITED STATES PATENT OFFICE.

ROBERT F. HARGRAVES, OF PROVIDENCE, RHODE ISLAND.

FRICTION RATCHET-CLUTCH.

SPECIFICATION forming part of Letters Patent No. 495,328, dated April 11, 1893.

Application filed September 9, 1892. Serial No. 445,403. (No model.)

*To all whom it may concern:*

Be it known that I, ROBERT F. HARGRAVES, of the city and county of Providence, in the State of Rhode Island, have invented a certain new and useful Improvement in Friction Ratchet-Clutches; and I declare the following to be a specification thereof, reference being had to the accompanying drawings.

Like letters indicate like parts.

Figure 1 shows my invention in diametrical section on line $y\ y$ of Fig. 2, the shaft and handle being in elevation. Fig. 2 is a top plan of my invention with the handle and shaft in cross section on line $x\ x$ of Fig. 1. In this figure the pawls are shown in clutching position. Fig. 3 is a top plan of the friction pawls and the bar on which they are mounted. Fig. 4 is a side elevation of the same. Fig. 5 is a top plan of my invention with the handle and shaft in cross section on line $x\ x$ of Fig. 1. In this figure the pawls are shown out of clutching position.

My invention relates to the class of friction clutches and consists of a head or pulley having an annular flange or rim and a central stud or shaft, in combination with a bar pivotally mounted on said stud or shaft and two friction pawls pivotally mounted on opposite ends of said bar, each pawl being provided with a heel on its inner surface near its pivot and having its outer edge curved to fit when extended upon and against the inner circular surface of said annular flange or rim and a handle also fitted upon said stud or shaft and provided with cams adapted to move said pawls into or out of frictional engagement with said annular flange or rim, as hereinafter particularly specified.

My device is applicable to all kinds of machinery in which a shaft is to be turned in one direction and prevented from turning in a reverse direction. In the drawings I show it as applied to a brake for a street-railway car.

A is the shaft terminating with a stud $a$ integral therewith, which is circumferentially channeled as seen at $b$.

B is the head having the hub $c$ and central socket $d$.

C is a bar having a central hole $e$, by which it is mounted loosely on the stud $a$. It is provided with a hub $m$, through which said hole $e$ extends.

The friction pawls D are mounted loosely on the bar C at opposite ends thereof, upon the screws or pivots $n$. On the inner edge of each pawl D near its pivot is a heel $o$. The head B also has an annular flange or rim $p$ and is secured to the shaft A by a pin $s$ or otherwise. The outer edge of each pawl D is for most of its extent made in a true circle to conform to and fit snugly against the inner surface of the annular rim or flange $p$.

F is a handle having a socket adapted to fit upon the stud $a$. It is held upon said stud by the set screw $t$, which enters the channel $b$. Said handle has at its socketed end the two cams $u$. Each of said cams has an exterior curved edge and a straight plane edge. When the handle F is turned in the direction of the movement of the hands of a watch, the cams $u$ spread the pawls D outwardly and their outer edges are brought into forcible contact with the inner surface of the annular flange or rim $p$ and are engaged thereby frictionally, so that the further rotation of the handle turns the head B and shaft A. The reverse movement of the handle F disengages the frictional contact of the pawls D with the annular flange $p$ and the straight or plane edge of the cams $u$, striking against the heels $o$ of the pawls D, draws said pawls away from said annular flange into the position shown in Fig. 5. The rotation of the handle F in this reverse direction has no effect whatever on the head B or shaft A, as its set screw $t$ will travel around the stud $a$ in the channel $b$.

I claim as a novel and useful invention and desire to secure by Letters Patent—

1. The improved friction ratchet clutch herein described, consisting of a head or pulley having an annular flange or rim, a stud or shaft on which said head or pulley is fastened, a bar centrally pivoted on said stud, two friction pawls mounted on opposite ends of said bar, a handle having two cams and a socket to fit upon said stud, all arranged and operating substantially as and for the purpose specified.

2. The combination of the shaft A having the stud $a$ and channel $b$, the head or pulley B secured to said stud or shaft and having the annular flange or rim $p$, the handle F having the set screw $t$ and a socket to receive said stud, the cams $u$ extending from said handle, the bar C centrally mounted upon said stud and the pawls D pivoted to said bar, substantially as described.

3. The combination of the shaft A having the stud $a$ and channel $b$, the head or pulley B secured to said shaft or stud and having the annular flange or rim $p$, the handle F having the set screw $t$ and a socket to receive said stud, the cams $u$ extending from said handle, the bar C centrally mounted on said stud and the pawls D pivoted to said bar and having the heels $o$, substantially as specified.

ROBERT F. HARGRAVES.

Witnesses:
   DANIEL W. FINK,
   WARREN R. PERCE.